Patented Oct. 4, 1932

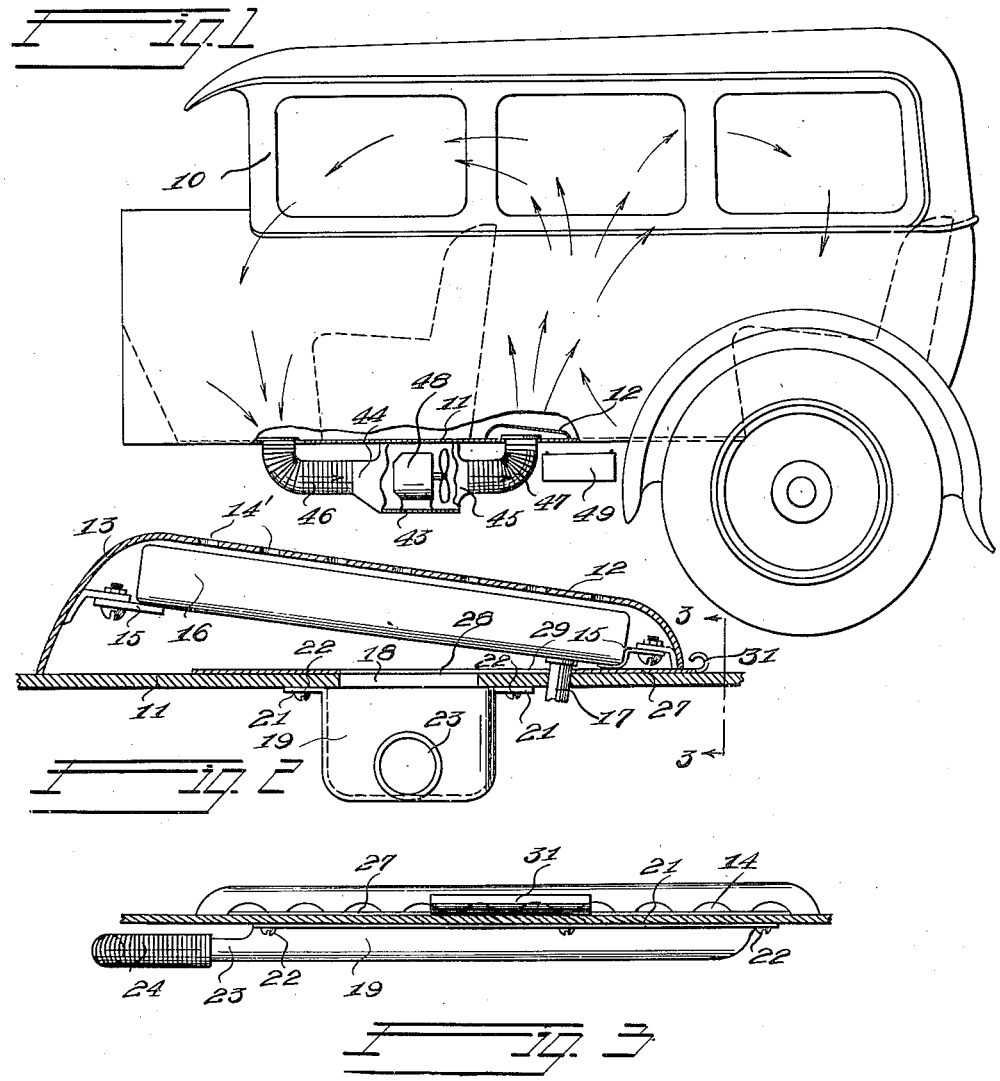
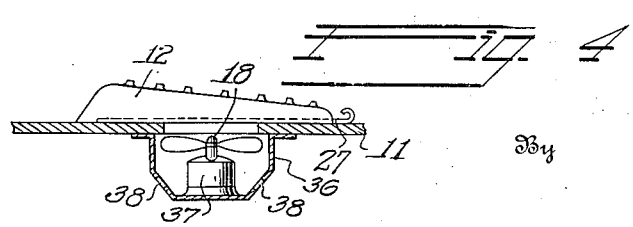

1,880,493

UNITED STATES PATENT OFFICE

CARL W. RUNDLETT, OF JACKSON HEIGHTS, NEW YORK, ASSIGNOR TO MOT-ACS, INC., OF NEW YORK, N. Y., A CORPORATION OF DELAWARE

AUTOMOBILE HEATING APPARATUS

Application filed May 16, 1928. Serial No. 278,196.

The present invention relates to apparatus for heating automobiles. More particularly, the invention relates to a system and apparatus for heating automobiles using the water of the engine cooling system and utilizing the heat contained in said water by causing the circulating air to contact with surfaces heated by said water under a natural draft supplemented by a forced draft.

In heating systems and apparatus of the above type heretofore employed in which the heating means was located wholly within the body of the automobile, the air in the body was heated solely by means of a natural circulation of the confined air therein through or over the heater.

In such arrangements, while the heating effects are generally satisfactory, the natural circulation of the air was, under some conditions, too slow whereby only a part of the available heat was utilized. Frequently, the circulation of air was not sufficiently rapid and uniform throughout the interior of the body and consequently the air within the body was heated comparatively slowly. When the same air is repeatedly passed through the heater without admitting fresh air, the confined air within the body becomes impure and oppressive especially as the space within the body is relatively small and accordingly contains only a small volume of air.

It is, accordingly, a primary object of this invention to provide a system and apparatus for heating automobiles avoiding the stated disadvantages and whereby the natural circulation of the air within the automobile in contact with the heater is accelerated so that the heat radiated from said heater is more rapidly and uniformly distributed throughout the interior of the automobile.

It is a further object of the present invention to provide a system and apparatus for heating automobiles in which the confined air within the automobile body comes in contact with a heater not only through natural circulation, but in which the circulation is variably accelerated and supplemented.

A still further object of the invention is to provide a system in which fresh air is admitted within the body commensurate with the requirements under the conditions that may exist at the time.

It is a still further object of the present invention to provide a system and apparatus for heating automobiles in which the radiated heat from a heater within the body of the automobile is conveyed throughout the body under the influence of a forced draft of a restricted quantity of fresh air from without the body and through said heater before entering the body proper.

With these objects in view as well as others that will become apparent from the following detailed disclosure, reference will be had to the accompanying drawing, disclosing preferred embodiments of my invention and forming part of said disclosure, wherein:—

Figure 1 is a diagrammatic partial side elevational view of an automobile disclosing the application of a heater according to my invention.

Figure 2 is a sectional view through the floor of an automobile disclosing a heater and air conveying means associated with said floor.

Figure 3 is a section through the automobile floor on line 3—3 of Figure 2 on a reduced scale.

Figure 4 is a view partly in section and partly in elevation disclosing a further modification.

Referring to the drawing by reference characters in which like characters designate like parts and referring to Figure 1, 10 designates an automobile body provided with a floor 11 to which is secured a heater 12 of a construction such as disclosed in co-pending application of Rowland and Rundlett, Serial No. 193,575, filed May 23, 1927, (now Patent Number 1,668,420, granted May 1, 1928). Said heater as shown in Figures 2, 3 and 4 essentially comprises a casing 13 provided with base apertures 14 as well as other apertures 14' in the top thereof to provide for an uninterrupted circulation of air through the casing. Secured within casing 13 by means of suitable brackets 15 parallel with the preferably sloping top of casing 13 is a construction such as disclosed in said co-pending application and which in accordance with said co-pending application is in communication with the engine cooling circulatory system of the automobile through inlet and outlet connections, one of which is shown in Figure 2, and designated 17. As disclosed in said application, a small portion of the hot water is diverted from the circulatory system through core 16, through which the air within the automobile body is caused to be circulated and to be heated by contact with the walls defining the cells of core 16.

In accordance with one of the embodiments of this invention, as disclosed in Figures 1, 2 and 3, a slot 18 is provided in floor 11 beneath core 16 and extending substantially throughout the length thereof. Secured to the bottom of floor 11 in alinement with slot 18 is a housing 19 provided with side flanges 21 through which screws 22 extend to secure said housing to the floor 11.

Disposed adjacent to or in contact with floor 11 and between core 16 and slot 18, as illustrated in Figures 2 and 3, is a shutter 27 provided with a slot 28 conforming to slot 18 and a narrow slot 29 at right angles to slot 18 for reception of connection 17 and further provided with an actuating handle 31.

When the shutter 27 is closed, shutting off the flow of air through opening 18, the air within body 10 will naturally circulate through heater 12 as in the above co-pending application. However, when the shutter 27 is wholly or partly opened, cool fresh air will be forced through housing 19 and through slot 18 into casing 13. Said fresh air will pass through the cells of core 16 and be heated in contact with the walls of the cells. At the same time, the circulation thus induced will draw further air through openings 14, thus increasing the circulation of the air within the body through core 16. Cool air adjacent the floor 11 is thus caused to flow more rapidly through the heater.

Accordingly, the heat radiated from core 16 will be more rapidly utilized and made effective within body 10, and fresh air will be supplied to the interior of body 10 thus ventilating the car body. The windows may be slightly opened to permit the escape of foul air. The amount of cool air admitted through slot 18 can be controlled at will by means of shutter 27 by bringing slots 18 and 28 into complete registry or by partially or wholly closing slot 18 by drawing shutter 27 outward of casing 13 to the desired position.

Thus in accordance with my invention, body 10 can be heated by a natural circulation of the air therein through heater 12 or by admitting cool fresh air under forced draft in variable amounts through heater 12 and the admittance of fresh air serves to accelerate the circulation of air that is already in the body.

In Figure 4 is disclosed a further modification of my invention wherein a casing 36 is secured to floor 11 beneath slot 18. Suitably mounted in casing 36 is an electric fan 37 adapted to be operatively connected to any suitable source of power, such as the battery of the automobile and which in operation thereof draws cool air through suitable apertures 38 in casing 36 and forces it through slot 18 into heater 12. The air thus forced into heater 12 acts in conjunction with the air under natural draft to accelerate the flow thereof as disclosed above in connection with the first form of the invention.

In Figure 1, is disclosed a still further modification of my invention wherein a suitable housing 43 is secured beneath floor 11 substantially below the front seat as indicated, the housing being provided with forward and rearward tubular extensions 44 and 45 respectively, to which are secured the inner or adjacent ends of flexible metallic hose sections 46 and 47 respectively. The open end of section 46 is extended through floor 11 in front of the front seat and provided with a suitable shutter or valve while the open end of section 47 is connected to the body beneath the heater 12 located between the front and rear seats.

Fixed within housing 43 is an electric fan 48 suitably connected with a battery 49.

In the operation of this form of my invention the cooler air within body 10 is drawn into section 46 by fan 48 and forced through section 47 and core 16 of heater 12. The natural circulation of air in body 10 continues and the forced draft, induced by fan 48, substantially assists and supplements said circulation, since the air admitted under the forced draft accelerates the flow of air under natural draft thus causing a more rapid and uniform circulation of the air within body 10 as indicated by the arrows. Better heating results may thus be secured and a high percentage of heat available from the water circulating in the heater may be utilized in heating the car.

From the foregoing disclosure, it will be seen that by means of my improved apparatus the air under natural circulation within the body of an automobile caused by contact with a heater is accelerated by means of a forced draft thus insuring a more rapid and uniform distribution of heat within the body as well as a purer state of the confined air within the body.

While I have disclosed certain specific embodiments of my invention, it is to be understood that my invention is not confined thereto, but that I am at liberty to make such changes or alterations as fairly fall within the scope of the sub-joined claims.

Accordingly, what I claim as new and desire to secure by United States Letters Patent is:—

1. In combination with an automobile having a normally closed body, a heating system comprising a housing in communication with the interior of said body, a casing within said body with which said housing communicates, a heating unit in said casing having openings to permit a natural circulation of air therethrough, and means in said housing for creating a forced circulation of air through said casing.

2. In combination with an automobile having a normally closed body, a heating system comprising a housing in communication with the interior of said body, a casing within said body with which said housing communicates, a heating unit in said casing having openings to permit a natural circulation of air therethrough, and means in said casing for creating a forced circulation of air from the car body and back into said car body through said casing.

3. In combination with a normally closed car body, a heating system comprising a housing communicating with said body at spaced apart locations, a casing within said body at one of said locations, a heating unit in said casing provided with openings to permit a natural circulation of air therethrough, and means in said housing for creating a forced circulation of air from the car body at the other of said spaced apart locations and back into the car body through said casing.

In testimony whereof I affix my signature.

CARL W. RUNDLETT.